Patented Apr. 1, 1930

1,752,305

UNITED STATES PATENT OFFICE

CARL LUDWIG LAUTENSCHLÄGER, OF FRANKFORT-ON-THE-MAIN, AND MAX BOCK-MÜHL AND RUDOLF SCHWABE, OF HOCHST-ON-THE-MAIN, GERMANY, ASSIGNORS, BY MESNE ASSIGNMENTS, TO WINTHROP CHEMICAL COMPANY, OF NEW YORK, N. Y., A CORPORATION OF NEW YORK

SOLUTION OF MEDICAMENT AND PROCESS OF PREPARING SAME

No Drawing. Application filed April 5, 1926, Serial No. 99,962, and in Germany April 21, 1925.

Our present invention relates to the preparation of solutions of medicaments.

We have found that the water-soluble ethers and esters of polyvalent alcohols, for instance the ethers of glycerine and glycol, such as glyceryl-di-ethylether, glycolmonoethylether or mono- or di-acetic glycerine ester, possess in a high degree the property of dissolving medicaments. The new solvents possess new and hitherto unknown properties in so far as their ratio of distribution is equally favorable in regard to oils and aqueous media and as, in consequence thereof, they are soluble in the cellular lipoids as well as in the serum.

Owing to the said properties, the new solvents are of great importance in medicinal therapy. For instance solutions of camphor in a fatty oil, as used in the treatment of cardiac affections, transmit the medicine but slowly from the spot of injection into the blood circulation, this being due to the inferior solubility of the hitherto used solvent in the humors of the tissues and in the serum of the human body. Solutions of camphor in our new solvents, however, are quickly absorbed by the system of the human body owing to their above-mentioned favorable ratio of distribution.

However our new solvents may also be used in other domains of therapeutics with good results both for administration per os and for parenteral administration. Thus, no proper solvent for soporifics has hitherto been known which, on the one hand, dissolves the soporifics in sufficient concentration and, on the other hand, is of such indifferent character that it may be injected without causing thereby an irritation of the tissue or intoxications.

Furthermore, when injecting certain basic chemo-therapeutics the fact that they are very difficultly soluble has proved to be very inconvenient; the respective bases are insoluble in water, whilst the salts are often extremely difficultly soluble. In some cases the salts when being dissolved in water even dissociate into a base and an acid, a fact which naturally prohibits the use of the substances in question for injections. By means of our new solvents it is, however, possible to easily prepare sufficiently concentrated solutions of the bases. These solutions, if they are not too concentrated, may generally be diluted with water in any desired degree, without there being any precipitation of the base. By means of the new solvents, whether they are diluted or undiluted with water, it is possible to improve in many cases also the solubility of the salts of the said bases.

The new solvents possess the further advantage that they permit for instance the preparation of solutions of several substances which are to be dissolved simultaneously. In this case it may occur that one of the components is very readily soluble in water, whereas the other component is very difficultly soluble therein. The use of such combined preparations for subcutaneous or intravenous administrations is impracticable. However by means of the solvents in question it is easy to prepare solutions which can be injected in their original concentration or diluted with water, or administered per os in potions.

The following examples serve to illustrate our invention:

1. 10 parts by weight of Japanese camphor are dissolved in 90 parts of glyceryl-di-ethylether. The solution thus obtained constitutes a limpid liquid.

2. 20 parts by weight of synthetic racemic camphor are dissolved in 80 parts of glycolmonoethylether. Thus a clear and light-colored solution is obtained.

3. One part by weight of diethylallylacetamide (see U. S. Patent No. 1,482,343 of January 29, 1924) is dissolved in 2 parts of glyceryl-di-ethylether. The liquid thus obtained is clear and limpid.

4. One part of diethylallylacetamide is digested in 2 parts of glycol monoethylether. Dissolution takes place very soon.

5. One part by weight of allylisopropyl-barbituric acid is dissolved in 9 parts of glyceryl-di-ethylether while gently heating.

6. 0.5 g. of 3.9-diamino-7-ethoxyacridine (see U. S. Patent application Serial No. 498,440, filed Sept. 3, 1921) are dissolved while heating in 10 ccm. of glyceryl-di-ethylether.

7. 5 g. of chlorphenylacetophenone (see German Patent No. 407,666) are dissolved in 45 g. of diacetine.

8. 20 g. of the mixture, composed of molecular quantities of the readily water-soluble sodium phenyldimethylpyrazolonemethylaminomethanesulfonate (see U. S. Patent No. 1,426,348 of August 22, 1922) and of the difficultly water-soluble dimethylaminophenyldimethylpyrazolone, are dissolved in a mixture of 20 g. of glyceryl-diethylether and 80 g. of water.

The solutions obtainable according to the foregoing examples can be sterilized by heat and are then permanently stable.

We claim:

1. A chemotherapeutic agent comprising a water-soluble derivative of a polyvalent alcohol in which at least one of the hydroxyl-hydrogens is replaced by an organic radicle, said derivative having in solution therein an organic medicament difficultly soluble in water.

2. A chemotherapeutic agent comprising a water-soluble ether of a polyvalent alcohol having in solution therein an organic medicament difficultly soluble in water.

3. A chemotherapeutic agent comprising a water-soluble ether of glycerol having in solution therein an organic medicament difficultly soluble in water.

4. A chemotherapeutic agent comprising a water-soluble derivative of a polyvalent alcohol of the group consisting of glycerol and glycol in which at least one of the hydroxyl-hydrogens is replaced by an organic radicle, said derivative having in solution therein an organic medicament difficultly soluble in water.

5. A chemotherapeutic agent comprising glyceryl-di-ethylether having in solution therein an organic medicament difficultly soluble in water.

In testimony whereof, we affix our signatures.

CARL LUDWIG LAUTENSCHLÄGER.
MAX BOCKMÜHL.
RUDOLF SCHWABE.